United States Patent [19]
Barringer et al.

[11] Patent Number: 5,338,074
[45] Date of Patent: Aug. 16, 1994

[54] THREADED PIPE CONNECTION

[75] Inventors: H. Paul Barringer, Humble; Gary E. Kirsch, Tomball; Keith C. Mott; Lawrence Y. Tung, both of Houston, all of Tex.

[73] Assignee: The Hydril Company, Houston, Tex.

[21] Appl. No.: 133,783

[22] Filed: Oct. 8, 1993

Related U.S. Application Data

[63] Continuation of Ser. No. 596,754, Oct. 10, 1990, abandoned, which is a continuation of Ser. No. 317,905, Mar. 2, 1989, abandoned.

[51] Int. Cl.⁵ .................................................. F16L 25/00
[52] U.S. Cl. ...................................... 285/334; 285/334.4
[58] Field of Search ......................... 285/333, 334, 334.4

[56] References Cited

U.S. PATENT DOCUMENTS

| Re. 30,647 | 6/1981 | Blose | 285/332.2 |
|---|---|---|---|
| 1,722,489 | 7/1929 | Bott | 384/480 |
| 2,062,407 | 12/1936 | Eaton | 285/334 |
| 2,181,343 | 11/1939 | Reimschissel | 285/917 X |
| 2,992,019 | 7/1961 | MacArthur | 285/110 |
| 3,359,013 | 12/1967 | Knox et al. | 285/334 X |
| 3,971,450 | 7/1976 | Fox | 415/903 X |
| 4,019,591 | 4/1977 | Fox | 175/107 |
| 4,113,290 | 9/1978 | Miida | 285/334 |
| 4,256,189 | 3/1981 | Fox et al. | 175/40 |
| 4,260,032 | 4/1981 | Fox | 175/107 |
| 4,260,167 | 4/1981 | Fox | 277/135 |
| 4,284,149 | 8/1981 | Fox | 175/40 |
| 4,308,927 | 1/1982 | Fox | 175/107 |
| 4,324,299 | 4/1982 | Nagel | 175/107 |
| 4,361,194 | 11/1982 | Chow et al. | 175/107 |
| 4,548,283 | 10/1985 | Young | 175/107 |
| 4,593,774 | 6/1986 | Lingafelter | 175/107 |
| 4,629,222 | 12/1986 | Dearden et al. | 285/334 X |
| 4,671,544 | 6/1987 | Ortloff | 285/334 |
| 4,683,964 | 8/1987 | Wenzel | 175/107 |
| 4,703,954 | 11/1987 | Ortloff et al. | 285/115 |
| 4,736,967 | 4/1988 | Mott et al. | 285/94 |
| 4,770,444 | 9/1988 | Hauk | 285/333 X |
| 4,795,200 | 1/1989 | Tung | 285/334 |
| 4,958,862 | 9/1990 | Cappelli et al. | 285/334 |
| 4,958,973 | 9/1990 | Sugimura | 285/333 X |
| 4,984,829 | 1/1991 | Saigo et al. | 285/334 |
| 5,007,665 | 4/1991 | Bovisio et al. | 285/334 |
| 5,069,298 | 12/1991 | Titus | 175/107 |

*Primary Examiner*—Dave W. Arola
*Attorney, Agent, or Firm*—Vaden, Eickenroht, Thompson, Boulware, & Feather

[57] ABSTRACT

A threaded pipe connection is disclosed comprising a box having internal threads and a pin having external threads for mating with the internal threads of the box. The mating threads exert radial forces on the box and pin creating compressive hoop stress in the pin and tensile hoop stress in the box. A conical sealing surface on the pin between the threads and the end of the pin engages conical sealing surface on the box and forms a metal-to-metal seal when the connection is made up. Means are provided for reducing the radial forces exerted by the threads adjacent the conical sealing surfaces to reduce excessive metal-to-metal contact bearing stress and better distribute the remaining stress in the engaging sealing surfaces while maintaining the contact stress required to provide an adequate seal.

2 Claims, 3 Drawing Sheets

THREADED PIPE CONNECTION

This application is a continuation of application Ser. No. 07/596,754, filed Oct. 10, 1990, now abandoned, which is a continuation of application Ser. No. 07/317,905, filed Mar. 2, 1989, now abandoned.

This invention relates to threaded pipe connections generally and, in particular, to such connections in which there is radial interference between the roots and crests of the threads and in which conical surfaces on the box and pin engage to provide a metal-to-metal seal for the connection.

Threaded connections used on oil country tubular goods often utilize a combination of tapered threads, which run out at the pipe body OD for tensile efficiency, and conical sealing surfaces that engage to form a metal-to-metal seal to contain high pressures. The tapered threads often generate radial interference as a means to retaining connection makeup torque and also to provide a resistant seal, usually with the aid of a pipe compound or a resilient seal ring. In order to contain high pressures, the radial interference of the metal-to-metal conical sealing surfaces must be significantly greater than that of the threads to generate sufficient contact bearing stress to overcome both the effect of machining tolerances and taper on the height of the threads most adjacent to the seal and the effects of excessive pipe compound trapped in the threaded area.

Excessive metal-to-metal contact bearing stress at the conical sealing surfaces as a result of manufacturing tolerance extremes can result in makeup damage, i.e., galling or may yield the connection material such that the sealing mechanism does not function reliably under repeated makeup and breakout. The problem arises in particular with threads having radial interference, such as the Series 500 wedge thread manufactured by the Hydril Company of Houston, Tex.

The conical sealing surfaces of threaded connections are located generally as close to the threads as possible to keep the pin and box from being unduly long. Therefore, the distance between the sealing surfaces and the threads is relatively short. When the threads have radial interference, the ability of the metal in the box and the pin to yield to excessive radial interference of the metal-to-metal sealing surfaces is substantially reduced resulting often in excessive metal-to-metal contact bearing stresses. As stated above, the distance between the conical sealing surfaces and the threads could be lengthened to reduce the problem but that is not a practical solution.

Therefore it is an object of this invention to provide a threaded pipe connection having threads with radial interference but that reduces and distributes the excessive metal-to-metal contact bearing stresses at the conical sealing surfaces without having to lengthen the pin and the box.

A further object of this invention is to provide such a connection in which the excessive metal-to-metal contact bearing stress is reduced and distributed by providing clearance between the threads adjacent the metal-to-metal sealing surfaces.

It is a further object of this invention to provide such a connection in which the clearance between the threads adjacent the sealing surfaces is obtained by cutting these threads so that the tapers of these threads on the box and pin diverge in the direction of the sealing surfaces.

These and other objects, advantages, and features of this invention will be apparent to those skilled in the art from a consideration of this specification, including the attached drawings and appended claims.

IN THE DRAWINGS

Figure 1:
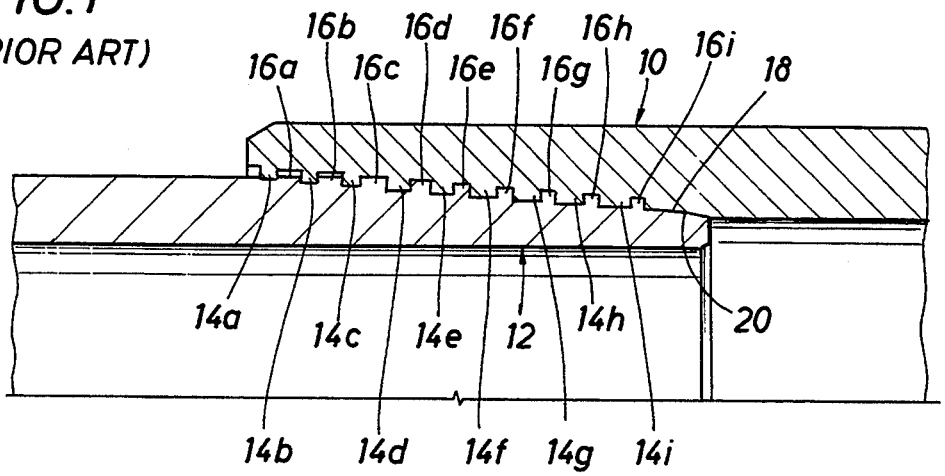
FIG. 1 is a sectional view of a threaded connection having the Hydril Series 500 wedge threads discussed above that move the flanks and the roots and crests of the threads into sealing engagement when the connection is made up thereby producing substantial radial interference.

The connection in FIG. 1 includes box 10 and pin 12. The box has approximately $9\frac{3}{4}$ full threads $14a$–$14i$. The pin has approximately $9\frac{3}{4}$ threads $16a$–$16i$, which includes five full threads $16d$–$16h$. In this connection, when the joint is made up, the flanks of the threads and the roots and crests of the threads provide a resistance seal helped, of course, by the thread lubricant that is used with the thread. Between thread $16i$ on the pin and the end of the pin is conical sealing surface 18, which engages conical surface 20 on the box to form a metal-to-metal seal when the connection is made up.

Figure 4:
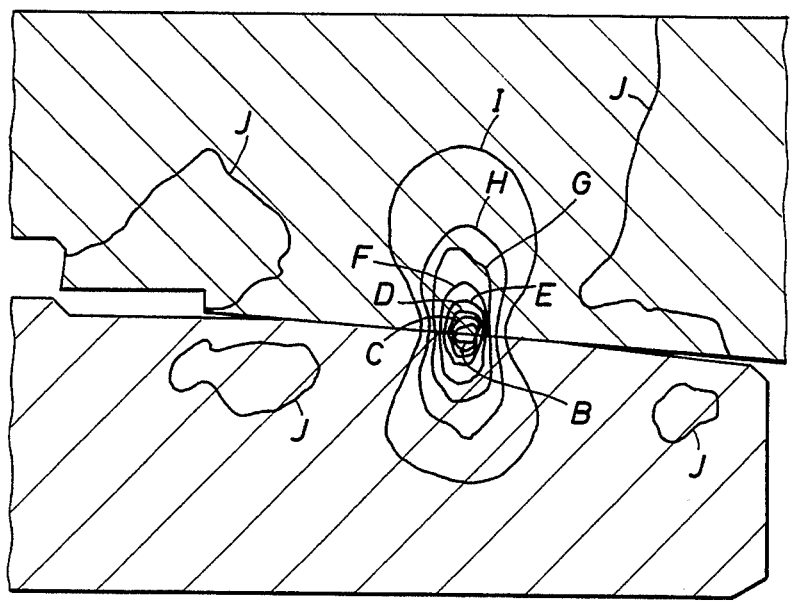
FIG. 4 is a computer produced stress plot of the metal adjacent the engaging conical sealing surfaces for the connection shown in FIG. 1.

The computer produced stress plot shown in FIG. 4, for a 7" diameter casing connection having the thread of FIG. 1, indicates a large area encircled by the contour line "B" where the contact bearing stress exceeds 40,000 psi. Between contour lines C and B, the stress will be between 35,000 and 40,000 psi.

Figure 2:
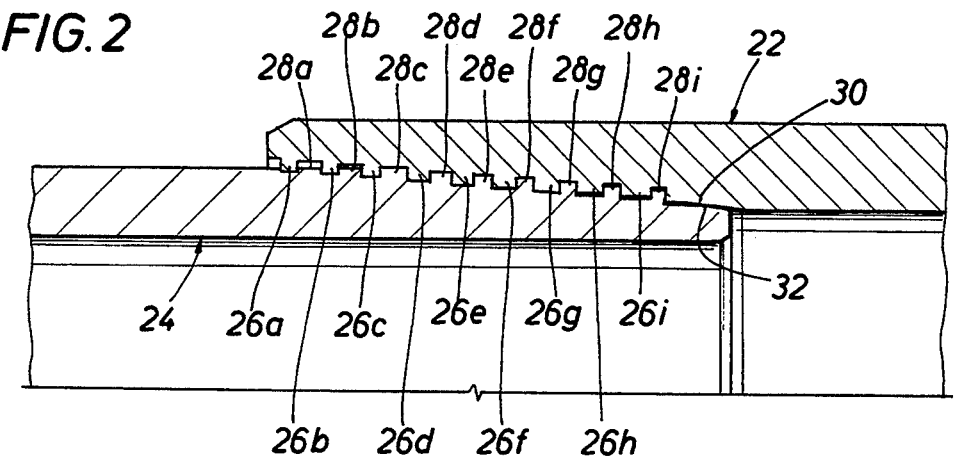
FIG. 2 is a sectional view of a threaded connection using the series 500 threads as shown in FIG. 1 modified in accordance with this invention.

In FIG. 2, in accordance with this invention, box 22 and pin 24 are also provided with the Series 500 wedge thread and with approximately $9\frac{3}{4}$ full threads $26a$–$26i$ on the box and $9\frac{3}{4}$ threads $28a$–$28i$, approximately five of which, $28d$–$28h$ are full threads on the pin. Conical sealing surface 30 is located on the pin between the end of the pin and first thread $28i$. This surface engages conical sealing surface 32 on the box to provide a metal-to-metal seal.

Figure 3:
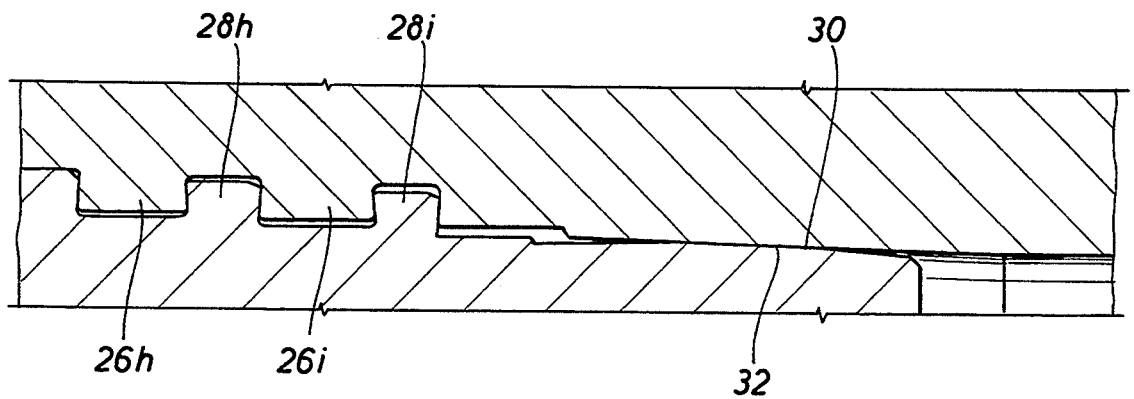
FIG. 3 is a sectional view on an enlarged scale of the conical sealing surfaces of the pin and box of FIG. 2 along with the adjacent threads.

The conical sealing surfaces on the connection shown in FIG. 1 and the connection shown in FIG. 2 are identical. They are shown on an enlarged scale in FIG. 3. Identification numbers are those used in connection with the FIG. 2 connection. The box has one long conical surface 32 that is cut to approximately 3° from the longitudinal axis of the connection. The pin has conical surface 30, which is also cut at 3°, but the surface on either side falls away so that only a portion of the conical surface on the box is engaged by the pin.

In accordance with this invention, means for reducing the radial forces exerted by the threads adjacent the conical sealing surface is provided to reduce the area of the engaging conical surfaces having excessive contact bearing stresses that could result in galling of the surfaces when they move relative to each other. At the same time, the remaining contact stresses are distributed over a greater length of the sealing surfaces to insure reliable seal.

In accordance with the preferred embodiment of this invention, such means comprise cutting the threads on the pin adjacent the sealing surfaces on a steeper taper than the taper of the threads on the box. For example, the threads on the box and threads 28a–28f on the pin could be cut with a taper of 0.028 inches per revolution whereas threads 28g–28i on the pin are cut with a taper of 0.038 inches per revolution.

The same thing could be accomplished by cutting the threads on the box adjacent the sealing surfaces at such a taper as to produce clearance between the roots and crests of the threads on the box and those on the pin, i.e., a shallower taper. Alternatively, the threads adjacent the sealing surfaces of both members could be clipped by reducing the height of the threads so that the roots and crests of the threads do not move into contact.

Figure 5:
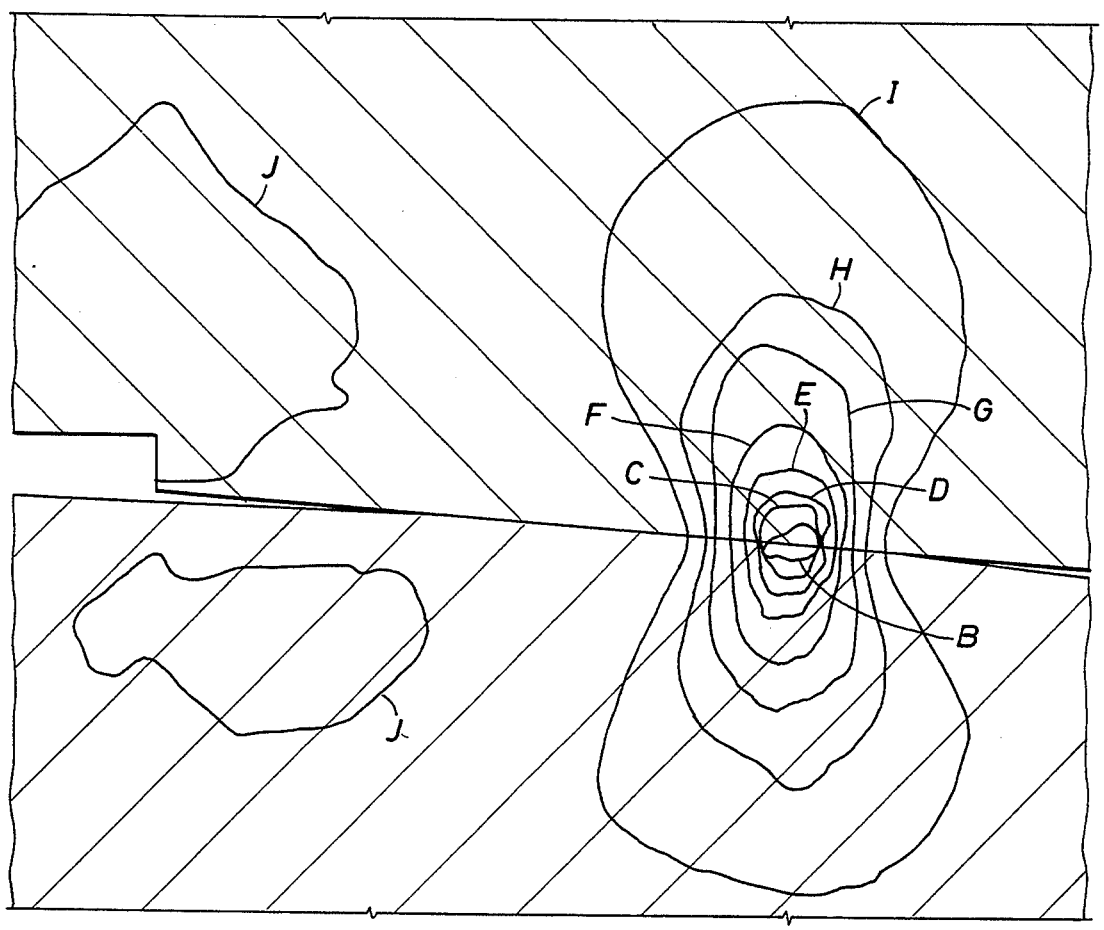
FIG. 5 is an enlarged view of the area of high contact bearing stress concentration from FIG. 4.
Figure 6:
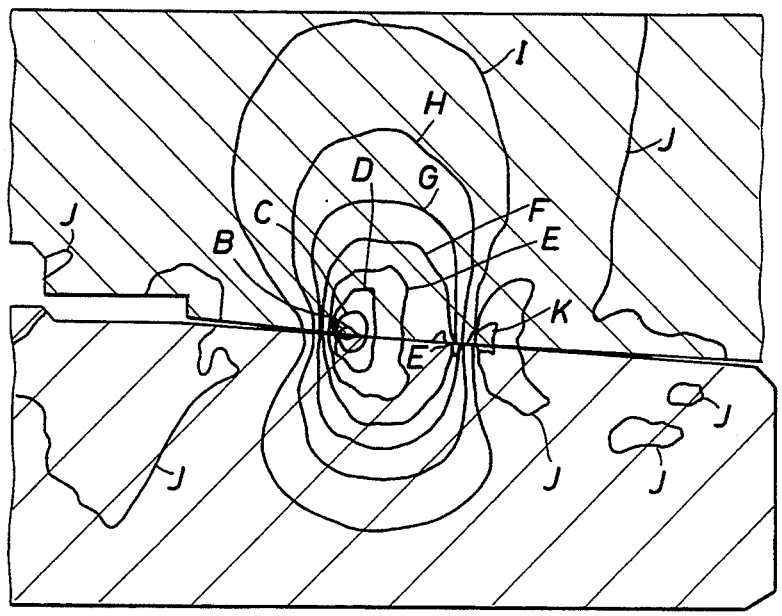
FIG. 6 is a computer produced stress plot of the metal adjacent the conical sealing surfaces of the connection shown in FIG. 2.
Figure 7:
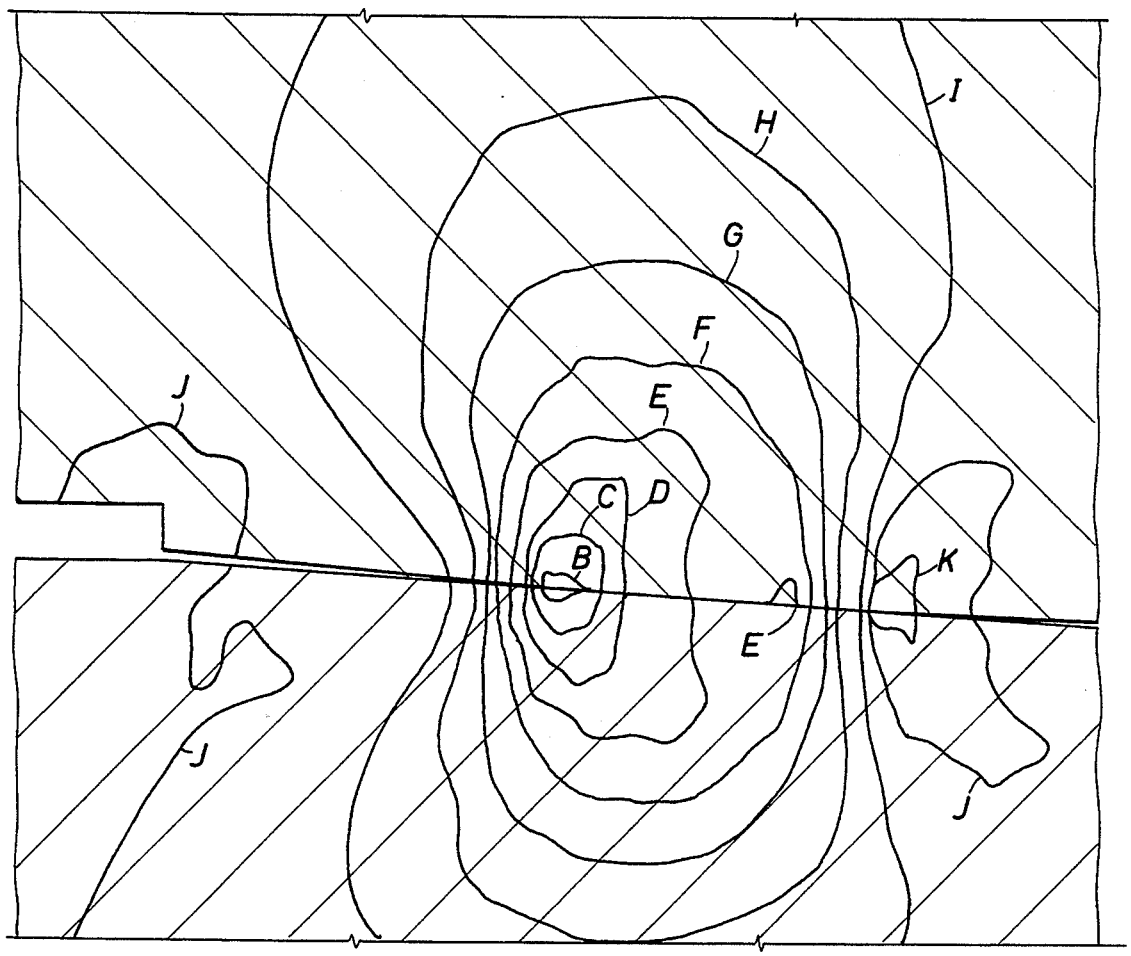
FIG. 7 is a view on an enlarged scale of the stress plot of FIG. 6 showing the area of high contact bearing stress.

As a result of the modification of the thread of FIG. 1 in accordance with this invention, the excessive contact bearing stresses between the conical sealing surfaces of the connection are substantially reduced as shown by the computer produced stress plot shown in FIG. 6 and on an enlarged scale in FIG. 7. Specifically, the area inside contour line B is substantially reduced as compared to FIGS. 4 and 5.

As explained above, this substantially reduces the chances of the surfaces being galled or cause to yield due to these excessive stresses thereby damaging the joint or causing the sealing mechanism to not function reliably under repeated makeup and breakout because of the galling or the yielding of the material adjacent the surfaces of the conical sealing surfaces.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A threaded pipe connection comprising a box having full form, tapered, internal, generally dovetail-shaped threads and a pin having tapered, external, generally dovetail-shaped, full form threads having flanks, roots, and crests that mate with the threads on the box when the connection is made up, a portion of said threads on the box and pin having roots and crests that move into engagement when the connection is made up hand-tight and exert radial forces on the box and pin creating compressive hoop stress in the pin and tensile hoop stress in the box when the connection is made up, said threads further having flanks that move into engagement when the connection is made up, and a conical sealing surface on the pin between the threads and the end of the pin and a conical sealing surface on the box to engage the conical sealing surface on the pin and form a metal-to-metal seal when the connection is made up, the improvement comprising a potion of the threads adjacent the conical sealing surface on at least one of the box and pin being full form threads over the entire length of the portion, said portion having a taper that diverges from the taper of the threads of the other of the box and pin so the roots and crests of these full form threads do not engage the roots and crests of the threads of the other of the box and pin so as to eliminate any forces between this portion and the other of the box and pin urging the sealing surfaces apart while allowing the flanks of the divergent threads to engage the flanks of the other of the box and pin to urge the sealing surfaces into sealing engagement and to remain in load bearing engagement.

2. The connection of claim 1 in which the change in the taper of the threads occurs in the two threads adjacent the sealing surfaces.

* * * * *